United States Patent [19]

Nja et al.

[11] Patent Number: 5,191,941
[45] Date of Patent: Mar. 9, 1993

[54] SUSPENSION DEVICE FOR A PLOW

[75] Inventors: Olav Njå; Elinar Ognedal, both of Kvernaland, Norway

[73] Assignee: Kverneland Klepp AS, Kvernaland, Norway

[21] Appl. No.: 781,591

[22] Filed: Oct. 23, 1991

[30] Foreign Application Priority Data

Nov. 15, 1990 [ES] Spain .................................. 9002903

[51] Int. Cl.$^5$ ...................... A01B 3/28; A01B 61/00
[52] U.S. Cl. .................... 172/224; 172/264; 172/271
[58] Field of Search ............. 172/224, 225, 261, 264, 172/269, 271

[56] References Cited

U.S. PATENT DOCUMENTS

| 3,451,489 | 6/1969 | Sullivan | 172/264 X |
| 3,517,748 | 6/1970 | Fischer | 172/224 |
| 3,662,840 | 5/1972 | Richey | 172/224 |
| 3,985,187 | 10/1976 | Callahan | 172/271 X |
| 4,189,007 | 2/1980 | Revett et al. | 172/224 |

FOREIGN PATENT DOCUMENTS

| 2293863 | 12/1974 | France | 172/224 |
| 2476967 | 9/1981 | France | 172/224 |

Primary Examiner—Randolph A. Reese
Assistant Examiner—Jeffrey L. Thompson
Attorney, Agent, or Firm—Foley & Lardner

[57] ABSTRACT

In a plow, particularly a reversible plow, one has aimed at a plow enabling plowing in hard soil affording very heavy resistance against the plow bodies (2), using comparatively small material dimensions and corresponding light weight of the plow. For this purpose, the plow beam (3), at the front end thereof, is pivotally mounted on the plow frame (1) and, somewhat spaced behind the pivot (4), a rotation restricting shear pin (5) is secured to the plow frame (1). The plow beam (3) is coupled to a lever (6) which, spaced from its connection point (7) to the plow beam (3), possibly via a longitudinally adjustable stop member (10), is resting supportingly on an adjacent plow beam portion. The lever (6) is, spaced from its said connection point (7) as well as from said supportingly resting portion/stop member (10), linked to an elastic compliant, resilient damper (11). Additionally, said damper (11) is connected to the plow frame (1) or to an element connected thereto. The last-mentioned element may with a reversible plow be constituted by a further lever (6') assigned to a further plow beam (3') carrying a plow body (2') of its own. The last-mentioned plow body (2') together with the first-mentioned plow body (2) may thereby form a plow body pair (2,2') in a reversible plow.

11 Claims, 1 Drawing Sheet

SUSPENSION DEVICE FOR A PLOW

BACKGROUND OF THE INVENTION

1. Field of the Invention

The invention relates to an arrangement in a single- or multi-share plow, and more especially to a reversible plow having one or more pairs of plow bodies, in order to allow limited elastic compliant rearward rotation of the plow body or each plow body, respectively, at the occurrence of very heavy plowing forces.

2. Description of the Related Art

In some agriculture areas, plows are subjected to very large loads, limiting their durability. This is caused by plowing through very dry and thus hard soil, and the plow bodies are subjected to heavy forces. Moreover, such hard soil will crack during plowing, and the force acting on each single plow body, the so-called plowing force, will consequently vary a great deal. When, additionally, the plowing depth is rather large, the maximum forces acting on the plow will be extra large.

The above-mentioned plowing situation will result in the plows being exposed to large vibration loads. Again, this may lead to material fatigue and fatigue fracture in the most exposed portions of the plow after a relatively short period of time.

Another problem associated with large vibration loads is that the vibrations may cause the screws in the screw joints of the plow to loosen.

It is, of course, possible to construct the plow using very large material dimensions such that it may absorb extreme plowing forces, but such a solution is inevitably associated with the disadvantages resulting from a very high consumption of materials and a very heavy plow construction.

SUMMARY OF THE INVENTION

An object of this invention is to provide a plow which is lightweight and does not require large material dimensions and which, therefore, is well suited for use when the plowing conditions are as described in the foregoing paragraphs.

A suspension device for a plow, comprising: a plow body; a plow frame; a plow beam being connected to said plow body and being pivotally connected to said plow frame; a rotation restriction mechanisms located on the plow frame, said rotation restriction mechanisms preventing a rotation of said plow beam beyond a predetermined point; a lever being pivotally connected at a first portion thereof to said plow beam; and having a stop member at a second portion, said stop member resting against said plow beam; and an elastic, compliant, resilient damper connecting a third portion of said lever to said plow frame, such that a damper force is provided to said plow body; wherein when said plow body is operating in a plowing mode and comes into contact with an object in the soil such that the plow body is deflected away from a force produced by the contact with the object, the damper force is increased to push the plow body back to its original position thereby allowing the plow body to vibrate during the plowing mode.

The elastic compliant, resilient damper means inserted between the restrictably pivotal plow beam and the plow frame or between two restricably pivotal plow beams of a plow body pair of a reversible plow, respectively, provides—in combination with the remaining plow body suspension—a very suitable and efficient elastic damping of said vibrations.

To avoid damage of the plow if any single load (plowing force) nevertheless becomes too large, said plow beam rotation limiting stop means may (each) be constituted by a shear pin dimensioned to be cut off at the occurence of an extreme load, in order to release the associated plow beam with its plow body and other parts coupled thereto.

Said stop member with which the link is resting supportingly against the associated plow beam, may advantageously be constituted by an adjustment means, e.g. in the form of an adjusting or set screw.

The set screw enables an adjustment of the biasing force of the damper means.

The damper means may have a control means between the connection points thereof for further adjustment of the biasing force. The damper means may consist of or, respectively, comprise an elastic rubber or plastic body. Alternatively, the damper means may as an example comprise coil and/or plate springs for effecting the necessary elastic compliance.

BRIEF DESCRIPTION OF THE DRAWINGS

An examplary embodiment of an arrangement according to the invention is diagrammatically shown in the accompanying drawing wherein.

DETAILED DESCRIPTION OF THE PREFERRED EMBODIMENT

Figure 1:
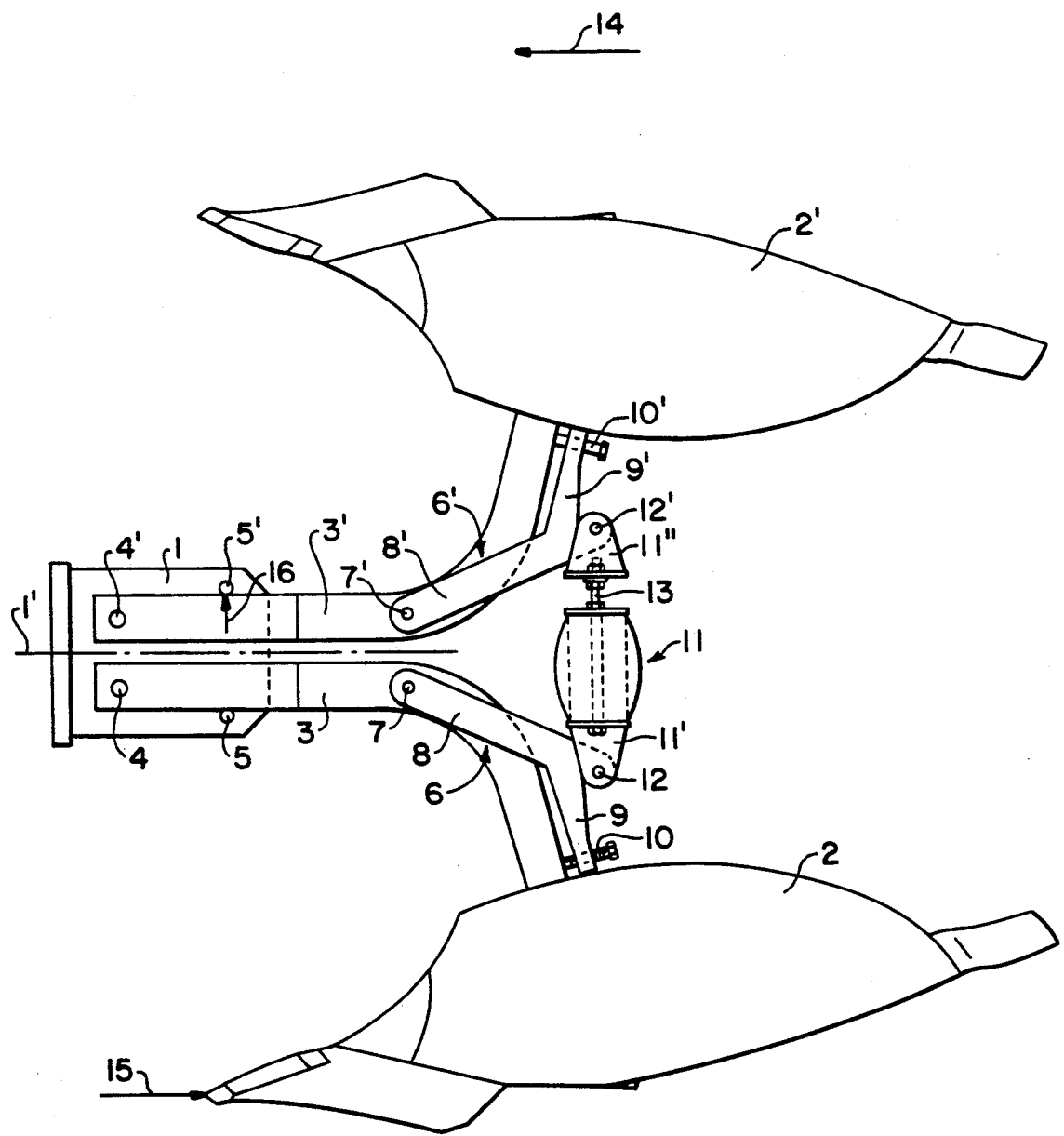
FIG. 1 is a side elevation view illustrating a suspension device for a plow body pair of a reversible plow.

In FIG. 1, the reference numeral 1 denotes a portion of the plow frame, the horizontal central plane of which is indicated by the line 1'.

A lower first plow body 2 placed in a plowing position, is included in a plow body pair of a reversible plow, wherein the upper second plow body of the pair is indicated at 2'.

The reversible plow may, of course, have several pairs of plow bodies beyond the pair 2,2' shown in FIG. 1.

Each plow body 2,2' is carried by a separate plow beam 3, 3'.

The plow beams 3,3' carrying the plow bodies 2,2' have identical suspension devices.

The plow beam 3 is pivotally mounted to the plow frame 1 by means of a pivot 4.

A rotation limiting stop means 5 for the plow beam 3 is located on plow frame 1. Plow beam 3 is pivotally connected to a mainly arched or angular lever 6 at the pivotal connection point 7. The lever 6 has a straight portion 8 and a portion 9 angled therefrom. The angled portion 9 carries at the end thereof a stop member, e.g. in the form of a set screw 10 or similar adjusting means.

Opposite the connecting point 7, the lever 6, at the end of its straight portion 8, is preferably pivotally connected about a bolt 12 to an elastic compliant, resilient damper generally denoted at 11.

The set screws 10,10' may be used to adjust the levers 6 6', whereby the levers 6,6' are caused to rotate through a small angle about the pivots 7,7' in order to establish the desired spring force between the plow beams 3,3'.

The suspension arrangement for the upper plow beam 3' is as mentioned above, identical to the one described in association with the lower plow beam 3 and includes a pivot 4', a rotation limiting stop means 5', a lever 6' having portions 8' and 9', pivots 7' and 12' as well as adjusting means in the form of a set screw 10'.

According to the embodiment shown, the elastic compliant, resilient damper 11 is inserted between the two plow beam-connected levers 6,6' incorporated in a suspension device for a pair of plow bodies 2,2' of a reversible plow. When no plowing is taking place, the damper 11 will urge the two plow beams 3,3' apart, causing them to rest against the stop means 5 and 5', respectively, assigned thereto.

In the examplary embodiment, the damper 11 is presupposed to be a rubber or plastic body having attachment pieces 11',11" at the ends thereof. The damper means 11 may be equipped with a control means 13, e.g. of the turn buckle type, with which the biasing force may be further adjusted, i.e. in addition to the adjusting possibility afforded by means of the set screws 10,10'.

The rotation restricting stop means 5,5' may advantageously consist of shear pins.

When plowing in the direction as indicated by the arrow 14, the plowing force will act against the plow body in the opposite direction as indicated by the arrow 15. The plowing force 15 results in the plow beam 3 trying to rotate about its pivot 4 on the plow frame 1. This rotation is counteracted by the damper means 11, compressing the latter a little, and simultaneously transmitting pressure to the upper plow beam 3'. However, the latter is resting on the shear pin 5' preventing the plow beam 3' to move. Thus the plowing force 15 propagates through different parts and exerts a pressure force against the upper shear pin 5' as indicated by the arrow 16. The pressure force 16 is dependent on the magnitude of the plowing force 15. In case the force 16 on the shear pin 5' exceeds the force for which the device has been designed and dimensioned, the pin 5' will shear off, whereafter the plow beams 3,3' with the plow bodies 2,2' and the damper means 11 will tilt about the pivots 4,4', and the plow body 2 will yield.

The result of the above is that the plowing force 15 will still vary, but the variation in that force being transferred to the plow structure will be much less than it would have been without the shown and described suspension device including the damper means, and, therefore, the maximum forces will normally be smaller.

The device according to the invention may also be used when the bolts or pins 5,5' do not function as shear pins, but exclusively act as stop means for the plow beams 3,3'.

As mentioned above, the device according to the invention may also be used in connection with an ordinary single- or multi-share lifting plow. Then, no plow body 2' is present, and the plow beam 3' is suitably modified. The damper means 11 may possibly be fastened directly to the plow frame 1, and, in such a case, the upper plow beam 3' may be omitted.

We claim:

1. A suspension device for a plow, comprising:
    a plow body;
    a plow frame;
    a plow beam being connected to said plow body and being pivotally connected to said plow frame;
    a rotation restricting mechanism located on the plow frame, said rotation restriction mechanism preventing a rotation of said plow beam beyond a predetermined point;
    a lever being pivotally connected at a first portion thereof to said plow beam and having a stop member at a second portion thereof, said stop member resting against said plow beam; and
    an elastic, compliant, resilient damper connecting a third portion of said lever to said plow frame, such that a damper force is provided to said plow body;
    wherein when said plow body is operating in a plowing mode in an original position and comes into contact with an object in the soil such that the plow body is deflected away from a force produced by contact with said object, said damp force is increased to push the plow body back to said original position thereby allowing said plow body to vibrate during said plowing mode.

2. A suspension device as recited in claim 1, wherein said rotation restricting mechanism is a shear pin.

3. A suspension device as recited in claim 1, wherein said stop member is adjustable such that when said stop member is adjusted said lever is rotated about said first portion and said damper force is changed.

4. A suspension device as recited in claim 3, wherein said stop member is an adjustable screw set.

5. A suspension device as recited in claim 1, wherein said lever has an angular shape including a first arm which is straight and a second arm which is angular in shape, and the first portion is located at an end of said first arm and said stop member is located at an end of said second arm.

6. A suspension device as recited in claim 1, further comprising a control for adjusting said damper force.

7. A suspension device as recited in claim 6, wherein said control is a turn buckle type.

8. A suspension device as recited in claim 1, wherein said damper includes an elastic body made from at least one of rubber and plastic.

9. A suspension device as recited in claim 1, wherein said damper includes at least one of a helical spring and a plate spring.

10. A suspension device for a plow, comprising:
    first and second plow bodies;
    a plow frame;
    first and second plow beams being connected to said first and second plow bodies, respectively, and each of said first and second plow beams being pivotally connected to said plow frame;
    first and second rotation restricting mechanisms located on said plow frame, said first and second rotation restricting mechanisms preventing the rotation of said first and second plow beams beyond first and second predetermined points, respectively;
    first and second levers being pivotally connected to said first and second plow beams, respectively, each of said first and second levers having a stop member resting against a corresponding one of said first and second plow beams; and
    an elastic, compliant, resilient damper connecting said first and second levers to each other to provide a damping force therebetween;
    wherein when one of said first and second plow bodies is in a normal plowing mode, said one of said first and second plow bodies vibrates due to said damping force.

11. A suspension device for a plow, comprising:
    a plow body;
    a plow frame;
    a plow beam being connected to said plow body and being pivotally connected to said plow frame;

a rotation restricting mechanism located on the plow frame, said rotation restriction mechanism preventing a rotation of said plow beam beyond a predetermined point;

a lever being pivotally connected at a first portion thereof to said plow beam and having a stop member at a second portion thereof, said stop member resting against said plow beam; and an elastic, compliant, resilient damper connecting a third portion of said lever to said plow frame, such that a damper force is provided to said plow body;

wherein when said plow body is in a plowing position, said plow body vibrates due to said damper force.

* * * * *